US010564452B2

(12) United States Patent
Lo et al.

(10) Patent No.: US 10,564,452 B2
(45) Date of Patent: Feb. 18, 2020

(54) DISPLAY MODULE AND MANUFACTURING METHOD THEREOF

(71) Applicant: Innolux Corporation, Miao-Li County (TW)

(72) Inventors: Ching-I Lo, Miao-Li County (TW); Hsin-Fa Hsu, Miao-Li County (TW); Tien-Jen Lin, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 63 days.

(21) Appl. No.: 15/448,646

(22) Filed: Mar. 3, 2017

(65) Prior Publication Data

US 2017/0276993 A1    Sep. 28, 2017

(30) Foreign Application Priority Data

Mar. 22, 2016  (TW) ............................. 105108860 A

(51) Int. Cl.
*G02F 1/1333*    (2006.01)
(52) U.S. Cl.
CPC ................. *G02F 1/133308* (2013.01); *G02F 2001/133317* (2013.01); *G02F 2201/503* (2013.01)
(58) Field of Classification Search
CPC . G02F 1/133308; G02F 2001/133311–133334
See application file for complete search history.

(56) References Cited

U.S. PATENT DOCUMENTS

| 9,046,706 B2 | 6/2015 | Ahn et al. |
| 2013/0236680 A1* | 9/2013 | Ahn .................. G02F 1/133308 428/68 |
| 2014/0204293 A1* | 7/2014 | Kim .................. G02F 1/133351 349/15 |

(Continued)

FOREIGN PATENT DOCUMENTS

| CN | 102393583 A | 3/2012 |
| CN | 103104865 A | 5/2013 |

(Continued)

OTHER PUBLICATIONS

Office Action dated Sep. 21, 2016 in corresponding Taiwan application (No. 105108860).

(Continued)

*Primary Examiner* — Sean P Gramling
(74) *Attorney, Agent, or Firm* — McClure, Qualey & Rodack, LLP

(57) ABSTRACT

The disclosure is directed to a display module and a manufacturing method thereof. The display module includes a display panel, a buffer structure, a fixing element, and an outer frame. The outer frame has a side frame portion and a bottom frame portion. The side frame portion and the bottom frame portion form a space. The display panel is in the space. The display panel includes a first substrate and a second substrate disposed oppositely. The first substrate has a first side surface. The second substrate has a second side surface adjacent to the first side surface. The buffer structure contacts the first side surface and the second side surface. The fixing element contacts the display panel and the outer frame. The side frame portion is between the buffer structure and the fixing element.

20 Claims, 3 Drawing Sheets

(56) References Cited

U.S. PATENT DOCUMENTS

2015/0382483 A1* 12/2015 Sun .................. G02F 1/133308
  361/679.01

FOREIGN PATENT DOCUMENTS

| CN | 103310708 A | 9/2013 |
|---|---|---|
| TW | 200947042 | 11/2009 |
| TW | 201219896 | 5/2012 |
| TW | 201310145 | 3/2013 |

OTHER PUBLICATIONS

CN Office Action issued by China National Intellectual Property Administration dated Aug. 13, 2019, Application No. 201610164592. X, pp. 1-7.

* cited by examiner

DISPLAY MODULE AND MANUFACTURING METHOD THEREOF

This application claims the benefit of Taiwan application Serial No. 105108860, filed Mar. 22, 2016, the subject matter of which is incorporated herein by reference.

BACKGROUND

Field of the Disclosure

The disclosure relates in general to a display module and a manufacturing method thereof, and more particularly to a display module with a buffer structure and a manufacturing method thereof.

Description of the Related Art

Along with the development in consumer electronic products and communication products, a liquid crystal display (LCD) has been widely used in various consumer electronic products and communication products such as liquid crystal TVs, notebook computers, desktop computers and smart phones. Generally speaking, the LCD includes a liquid crystal display panel and a backlight module.

According to the design of display module, a glass is supported by a plastic frame, and the plastic frame is used as a protection, an insulation, or a buffer mechanism between the glass and an iron frame. However, as the requirement for narrow rimmed display is getting higher and higher, the required thickness of the plastic frame would be too thin to form, and the degree of rim narrowness would be restricted. One solution to the problem is using a tape as a buffer and insulation mechanism between the iron frame and the glass. However, along with the thinning tendency of consumer electronic products and communication products, attachment of the tape is getting more and more difficult, and the tape may easily be attached to an outside of an outline of the iron frame or may easily be exposed from the iron frame, causing short-circuiting. Since the plastic frame and the tape, being soft and lacking sufficient hardness, are hard to be clamped, reclaimed and assembled, the automation assembly system is hard to be introduced to the production line. Moreover, the plastic frame is more expensive than a glue or the tape, and the display module includes a plastic frame which requires a gap between the plastic frame and the iron frame, therefore the internal components of the display module are more likely to be displaced.

SUMMARY OF THE DISCLOSURE

The disclosure is directed to a display module and a manufacturing method thereof.

According to an aspect of the present disclosure, a display module is provided. The display module comprises a display panel, a buffer structure, a fixing element, and an outer frame. The outer frame has a side frame portion and a bottom frame portion. The side frame portion and the bottom frame portion form a space. The display panel is in the space. The display panel comprises a first substrate and a second substrate disposed oppositely. The first substrate has a first side surface. The second substrate has a second side surface adjacent to the first side surface of the first substrate. The buffer structure contacts the first side surface and the second side surface. The fixing element contacts the display panel and the outer frame. The side frame portion is between the buffer structure and the fixing element.

According to another aspect of the present disclosure, a manufacturing method of a display module is provided. The manufacturing method comprises the following steps. A display panel is provided. The display panel comprises a first substrate and a second substrate disposed oppositely. The first substrate has a first side surface. The second substrate has a second side surface adjacent to the first side surface of the first substrate. The display panel is disposed in the outer frame. A buffer structure is disposed to contact the first side surface and the second side surface. The buffer structure comprises a coated gel.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

A display module is disclosed in the embodiment of the disclosure. A buffer structure comprising a coated gel is disposed between a display panel and an outer frame. The buffer structure may be used as a protection layer to prevent the display panel from being damaged by avoiding colliding between the outer frame and the display panel. The coated gel can be precisely coated by using an automation machinery. Since the coated gel has a small thickness, a rim width of the display device can further be improved. The design of replacing the plastic frame with the coated gel can reduce the cost and dispense with the plastic frame and a gap between the plastic frame and the outer frame, such that internal components of the display module are less likely to be displaced after assembly.

It should be noted that although the present disclosure does not illustrate all possible embodiments, other embodiments not disclosed in the present disclosure are still applicable. Moreover, the dimension scales used in the accompanying drawings are not based on actual proportion of the product. Therefore, the specification and drawings are for explaining and describing the embodiment only, not for limiting the scope of protection of the present disclosure. Furthermore, descriptions of the embodiments, such as detailed structures, manufacturing procedures and materials, are for exemplification purpose only, not for limiting the scope of protection of the present disclosure. Suitable modifications or changes can be made to the structures and procedures of the embodiments to meet actual needs without breaching the spirit of the present disclosure. Designations common to the accompanying drawings are used to indicate identical or similar elements.

Figure 1:
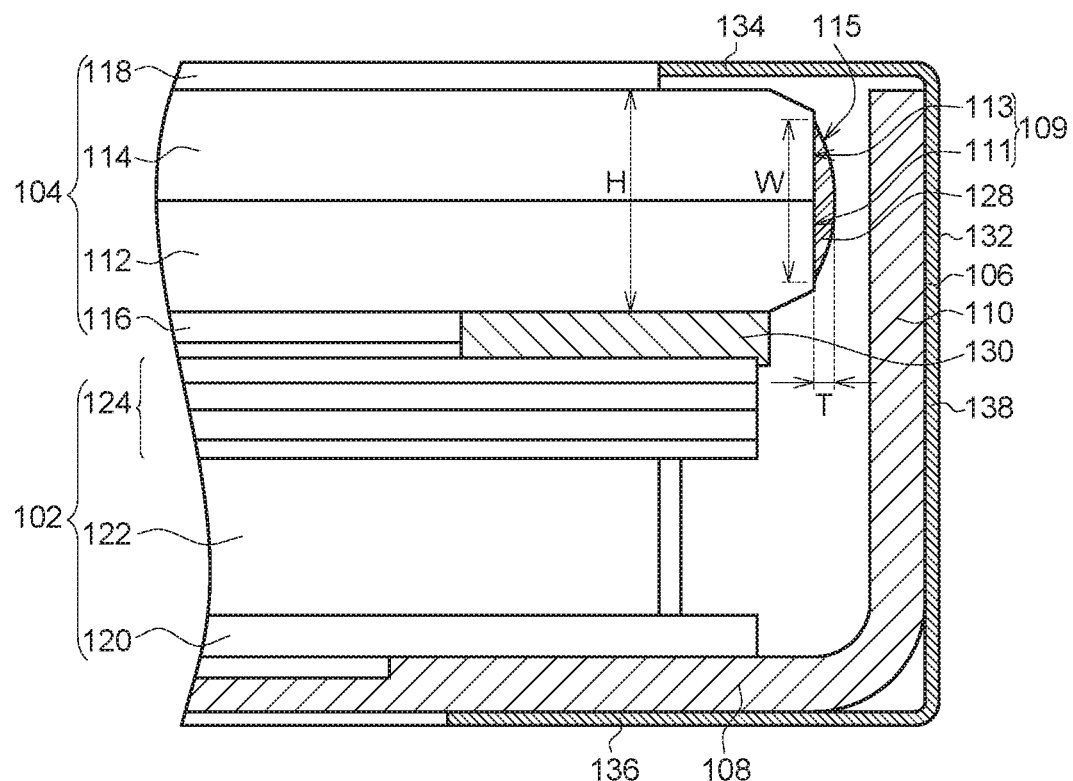
FIG. 1 is a partial cross-sectional view of a display module according to an embodiment.

FIG. 1 is a partial cross-sectional view of a display module according to an embodiment. The display module may comprise a backlight module 102, a display panel 104 and an outer frame 106. The outer frame 106 comprises a bottom frame portion 108 and a side frame portion 110 adjacent to the bottom frame portion 108. The outer frame 106 may comprise a material of metal such as iron. The backlight module 102 and the display panel 104 are disposed in a space formed by the bottom frame portion 108 and the side frame portion 110.

The display panel 104 comprises a first substrate 112 and a second substrate 114 disposed oppositely. A side surface 109 of the display panel 104 comprises a first side surface 111 of the first substrate 112 and a second side surface 113 of the second substrate 114. The first side surface 111 is adjacent to the second side surface 113. For example, the first side surface 111 and the second side surface 113 may be parallel to each other. In other words, a normal direction of the first side surface 111 and a normal direction of the second side surface 113 may be parallel to each other. In an embodiment, the first side surface 111 and the second side surface 113 may not be parallel to each other. In an embodiment, for example, the display panel 104 is a liquid crystal display panel. One of the first substrate 112 and the second substrate 114 may be a thin-film transistor array substrate, the other of the first substrate 112 and the second substrate 114 may be a color filter substrate. A display medium (not illustrated), such as a liquid crystal layer, is interposed between the first substrate 112 and the second substrate 114. A polarizer 116 and a polarizer 118 may be disposed on the first substrate 112 and the second substrate 114, respectively.

The backlight module 102 may comprise a reflector 120, a light guide plate 122 and an optical layer 124. The optical layer 124 may be disposed on a light-emitting side of the light guide plate 122. The optical layer 124 may comprise a diffusion sheet, a light enhancement sheet, a prism sheet, a protection sheet, etc. The optical layer 124 is not limited to a multi-layer structure as shown in the figure. In other embodiments, the optical layer 124 may be a single-layer structure. In an embodiment, a light source (not illustrated) of the backlight module 102 may be a side-in light source or a direct-type light source. Accompanying components of the backlight module 102 can be suitably adjusted according to actual needs.

As indicated in FIG. 1, a coated gel 128 contacts the first side surface 111 of the first substrate 112 and the second side surface 113 of the second substrate 114 of the display panel 104. In an embodiment, the coated gel 128 can be precisely coated by using an automation machinery. Therefore, the display module can be effectively assembled by using an automation system. For example, the coated gel 128 may be a gel layer formed by curing an adhesive coated by a coating machine. The coated gel 128 may have a curved surface 115. The coated gel 128 has a thickness T between 0.05 mm and 0.5 mm. The thickness T of the coated gel 128 is smaller than a thickness of the plastic frame usually formed by an injection molding method. The thickness of the plastic frame may be between 0.4 mm and 1 mm, for example. Therefore, the coated gel 128 not only incurs lower cost but also reduces the rim width of the display module.

The coated gel 128 can be used as a buffer mechanism between the display panel 104 and the outer frame 106 to prevent the display panel 104 from colliding with the outer frame 106 and becoming damaged. A material of the coated gel 128 can be suitably selected according to actual needs. For example, the material of the coated gel 128 may comprise an insulating material for electrically isolating the display panel 104 from the outer frame 106. The material of the coated gel 128 may comprise a conductive material for electrically connecting the first substrate 112 and/or the second substrate 114. For example, the coated gel 128 may electrically connect a test circuit exposed from a side surface of the glass substrate and provide an electrical test point to the display panel 104. In one of embodiments, the coated gel 128 can be used for grounding. In one of embodiments, depending on actual situations, the conductive coated gel 128 can be removed after an electrical test is completed. In one of embodiments, the coated gel 128 may be a conductive coated gel formed by using a dispensing method and have a smaller volume/area, and the coated gel 128 can be separated from the outer frame 106 through a thicker portion of other elements (such as the plastic frame) without causing any unexpected short-circuiting, and therefore can remain in the display module. If the outer frame 106 has an insulating material or the coated gel 128 is disposed on an insulating part of the display panel 104, the conductive coated gel 128 can be interposed between the display panel 104 and the outer frame 106.

In an embodiment, firstly, the coated gel 128 is disposed on a side surface 109 of the display panel 104. Then the display panel 104 and the coated gel 128 are together disposed in the outer frame 106. In the present embodiment, the coated gel 128 and the outer frame 106 can be separated from each other by an empty gap as indicated in FIG. 1. A width W by which the coated gel 128 contacts the first side surface 111 and the second side surface 113 is smaller than or equivalent to a total height H of the first substrate 112 and the second substrate 114.

In another embodiment, firstly, the display panel 104 is disposed on the backlight module 102 in the outer frame 106. Then, the coated gel 128 is coated on to the side surface 109 of the display panel 104. In one of circumstances, when a gap between the display panel 104 and the outer frame 106 is small, the coated gel 128 would be connected between the display panel 104 and the outer frame 106. In the other circumstances, when the gap between the display panel 104 and the outer frame 106 is large, the coated gel 128 and the outer frame 106 would be separated from each other by an empty gap.

The design of replacing the plastic frame with coated gel 128 can dispense with the plastic frame and the gap between the plastic frame and the outer frame 106, such that internal components of the display module are less likely to be displaced after assembly is completed.

A spacer 130 may be disposed between the backlight module 102 and the display panel 104 to adjust a distance between the display panel 104 and the backlight module 102. The spacer 130 comprises a tape or a coated gel. In an embodiment, the spacer 130 is disposed on the first substrate 112 of the display panel 104, and then the display panel 104 and the spacer 130 are together disposed on the backlight module 102. In another embodiment, the spacer 130 is disposed on the backlight module 102, and then the display panel 104 is disposed on the spacer 130.

In some embodiments, the spacer 130 may have a property of shielding light. That is, the spacer 130 can be used as a light shield to avoid light leakage. In one of embodiments, for example, a length of the optical layer 124 may be smaller than a length of the light guide plate 122, and the spacer 130 may be directly disposed on an upper surface of the light guide plate 122 not covered by the optical layer 124. The spacer 130 can avoid the light leaking from a side surface of the light source.

In one of embodiments, the spacer 130 can be omitted, and an extending portion of the plastic frame (not illustrated) extended between the backlight module 102 and the display panel 104 may be used to support the display panel 104.

The fixing element 132 contacting the outer frame 106 and the display panel 104 is disposed for positioning the display panel 104 and the backlight module 102. In an embodiment, the fixing element 132 comprises a single-sided adhesive. For example, the fixing element 132 comprises an upper portion 134, a lower portion 136 and a side portion 138 adjoined between the upper portion 134 and the lower portion 136. The upper portion 134 contacts the display panel 104 by the second substrate 114 for example. The side portion 138 and the lower portion 136 respectively contact the side frame portion 110 and the bottom frame portion 108 of the outer frame 106. In other embodiments (not illustrated), the lower portion 136 of the fixing element can be omitted, that is, the fixing element has an L-shape of the upper portion 134 and the side portion 138.

FIG. 2 to FIG. 5 are upper views of display modules according to different embodiments. The upper views only show the display panel 104, the outer frame 106 and the buffer structure 126.

Figure 2:
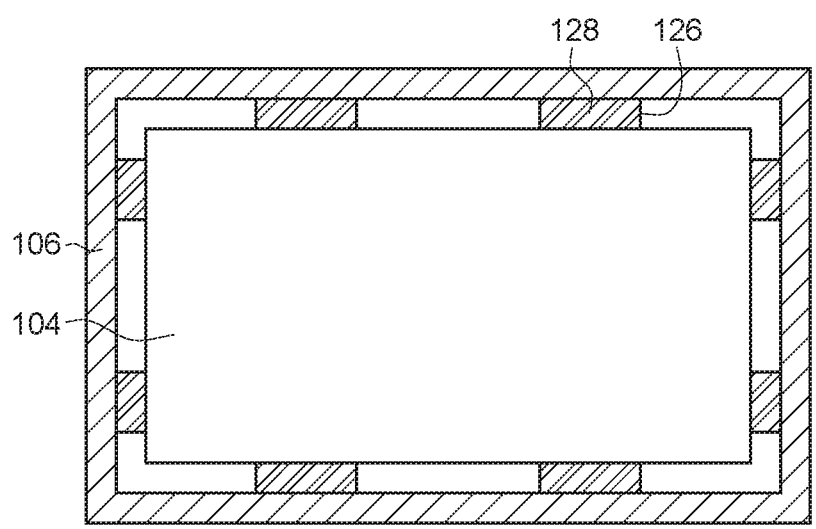
FIG. 2 is an upper view of a display module according to an embodiment.

Refer to FIG. 2. The buffer structure 126 disposed between the display panel 104 and the outer frame 106 comprises a plurality of the coated gels 128 separated from each other.

Figure 3:
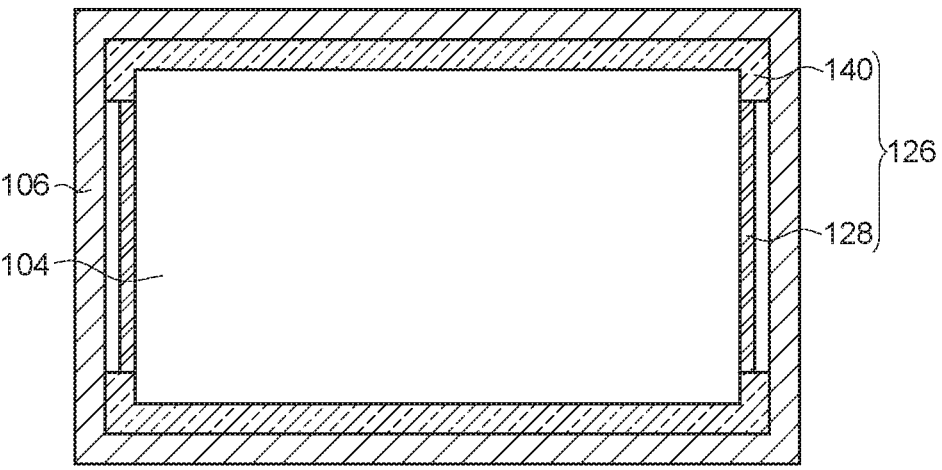
FIG. 3 is an upper view of a display module according to an embodiment.

Refer to FIG. 3. The buffer structure 126 disposed between the display panel 104 and the outer frame 106 comprises the coated gel 128 and a plastic frame 140 adjoined to the coated gel 128.

Figure 4:
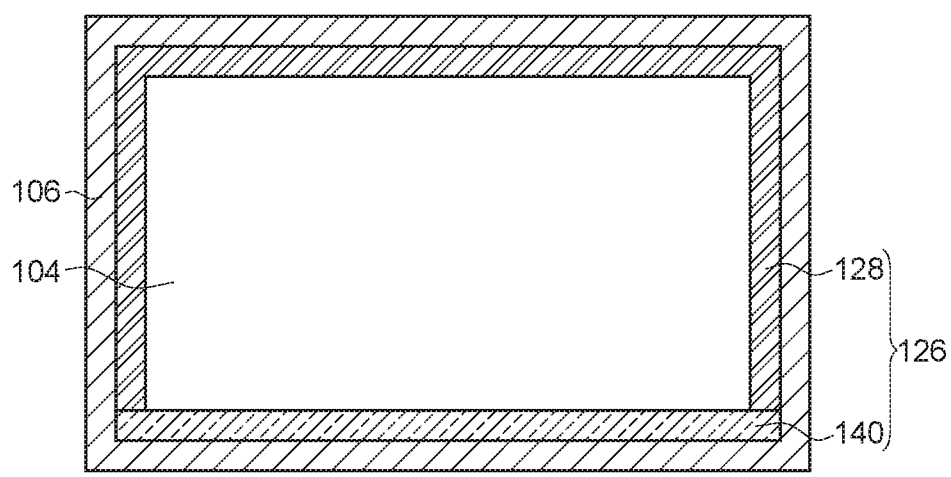
FIG. 4 is an upper view of a display module according to an embodiment.

Refer to FIG. 4. The buffer structure 126 disposed between the display panel 104 and the outer frame 106 comprises a coated gel 128 and the plastic frame 140 adjoined to the coated gel 128.

Figure 5:
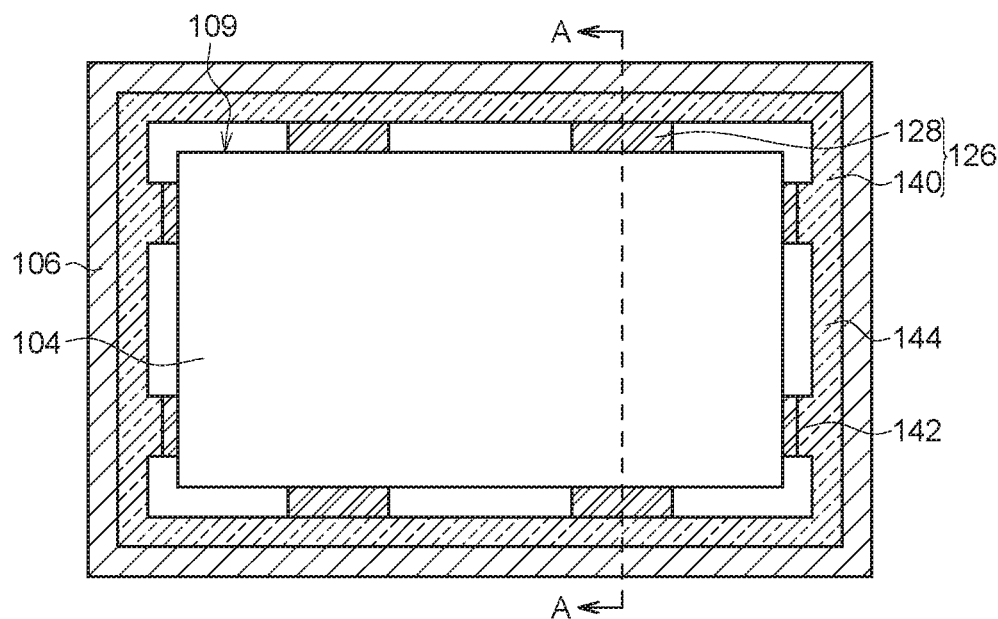
FIG. 5 is an upper view of a display module according to an embodiment.

Refer to FIG. 5. Difference between the display module of FIG. 5 and the display module of FIG. 2 is disclosed as the following description. The buffer structure 126 further comprises a plastic frame 140 interposed between the coated gel 128 and the outer frame 106. The plastic frame 140 comprises a plastic frame body 144 and a protruding portion 142 protruded from the plastic frame body 144 corresponding to the coated gel 128.

In an embodiment, the side surface 109 of the display panel 104 contacts one of the coated gel 128 and the plastic frame 140. In other words, in any cross-sectional views of the display panel 104 crossing the side surfaces 109, the side surface 109 of the display panel 104 contacts one of the coated gel 128 and the plastic frame 140. For example, viewing from the cross-section view (not illustrated) of the buffer structure 126 of FIG. 3, no extra plastic frame contacting the side surface 109 of the display panel 104 exists above or under the coated gel 128, and no extra coated gel contacting the side surface 109 of the display panel 104 exists above or under the plastic frame 140. For example, viewing from the cross-section view (not illustrated) of the buffer structure 126 of FIG. 4, no extra plastic frame contacting the side surface 109 of the display panel 104 exists above or under the coated gel 128, and no extra coated gel contacting the side surface 109 of the display panel 104 exists above or under the plastic frame 140.

Figure 6:
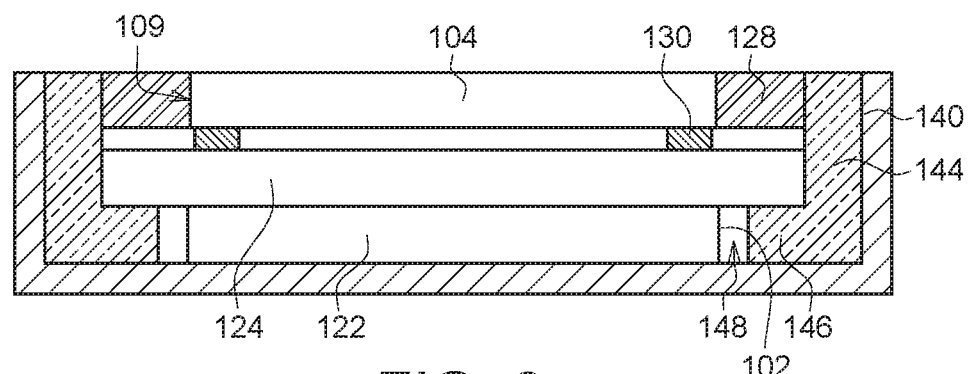
FIG. 6 is a cross-sectional view of a display module according to an embodiment.

FIG. 6 is a cross-sectional view of a display module according to an embodiment. The display module is viewed along a cross-sectional line AA of FIG. 5. The plastic frame 140 comprises a bottom plastic frame portion 146 extended from a bottom portion of the plastic frame body 144. In the plastic frame body 144, the length of the optical layer 124 is larger than the length of the light guide plate 122. Furthermore, the optical layer 124 crosses over and shields an empty gap 148 between the light guide plate 122 and the bottom plastic frame portion 146, such that light leakage can be avoided and the display quality of the display can be improved. As indicated in FIG. 6, the side surface 109 of the display panel 104 contacts the coated gel 128 only, but not the plastic frame 140. The spacer 130 can be disposed between the backlight module 102 and the display panel 104.

In one of embodiments, the plastic frame 140 comprises an extending portion (not illustrated) extended between the backlight module 102 and the display panel 104. The extending portion replaces the spacer 130 and supports the display panel 104. The extending portion (not illustrated) of the plastic frame 140 can be extended under the coated gel 128 of FIG. 6 without contacting the side surface 109 of the display panel 104. That is, the side surface 109 of the display panel 104 of FIG. 6 only contacts the coated gel 128 but not the extending portion of the plastic frame 140. The above concept can also be used in one of embodiments in which the display module has the plastic frame.

The present disclosure is not limited to the above embodiments. The concepts of the embodiments can have different combinations. For example, the buffer structure 126 is not limited to the coated gel 128 disposed on a partial peripheral of the display panel 104 as indicated in FIG. 2, and can be realized by a coated gel (not illustrated) having a continuous frame shape and disposed on a whole peripheral of the display panel 104. In one of embodiments, the coated gel 128 and the plastic frame 140 of FIG. 3 can be separated from each other by an empty gap. In one of embodiments, the coated gel 128 and the plastic frame 140 of FIG. 4 can be separated from each other by an empty gap. In other embodiments, quantity, shape, position or property of the coated gel 128, the plastic frame 140 of the buffer structure 126 can be suitably adjusted.

Depending on actual needs, the present disclosure is allowed to omit or add elements, change the configuration or adjust the properties of the elements.

In one of embodiments, for example, the length of the optical layer 124 (FIG. 1, FIG. 6) can be smaller than the length of the light guide plate 122, and a light shield (not illustrated) can be disposed on the light guide plate 122 outside the optical layer 124 and not covered by the optical layer 124 to avoid light leakage. In one of embodiments, for example, the extending portion (not illustrated) of the plastic frame 140 can be extended to cross over the light shield and to be on the optical layer 124, and the light shield can prevent the light of the light source from emitting off an empty gap between a lower surface of the extending portion and an upper surface of the optical layer 124, hence avoiding light leakage. In one of embodiments, for example, the extending portion of the plastic frame 140 can be omitted, and the light shield can be disposed between the light guide plate 122 and the display panel 104. In one of examples, the light shield can be used as a spacer, and thus is adjoined between the light guide plate 122 and the display panel 104. The light shield may comprise a buffer element, a tape, or a coated gel. The coated gel can be precisely arranged on the light guide plate 122 by using an automation machinery. For example, the coated gel can be continuously or discontinuously coated on a peripheral of the light guide plate 122. For example, the coated gel may have a continuous frame shape.

As disclosed above, the buffer structure disposed between the display panel and the outer frame comprises the coated gel. The coated gel can be precisely coated by using an automation machinery, therefore the display module can be precisely assembled by way of automation. Since the coated gel is thinner than the plastic frame, the rim width of the display module can be further improved. The coated gel incurs lower cost. The design of replacing the plastic frame with the coated gel can dispense with the plastic frame and the gap between the plastic frame and the outer frame, such that internal components of the display module are less likely to be displaced after assembly is completed.

While the disclosure has been described by way of example and in terms of the preferred embodiment (s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display module, comprising:
    an outer frame having a side frame portion and a bottom frame portion, wherein the side frame portion and the bottom frame portion form a space;
    a display panel in the space, and comprising:
    a first substrate having a first side surface; and
    a second substrate having a second side surface, wherein the first substrate and the second substrate are disposed oppositely, the first side surface is adjacent to the second side surface;
    a buffer structure contacting the first side surface and the second side surface;
    a fixing element contacting the display panel and the outer frame, wherein the side frame portion is between the buffer structure and the fixing element;
    a backlight module comprising an optical layer; and
    a spacer between the backlight module and the display panel, and the spacer contacting the display panel and the optical layer of the backlight module;
    wherein the spacer and the side frame portion are completely separated by an air gap.

2. The display module according to claim 1, wherein the buffer structure comprises a coated gel and a plastic frame, the first side surface and the second side surface contact one of the coated gel and the plastic frame.

3. The display module according to claim 2, wherein a width of the coated gel contacting the first side surface and the second side surface is smaller than or equivalent to a total height of the first substrate and the second substrate.

4. The display module according to claim 1, wherein the fixing element is disposed outside the outer frame and contacts the display panel.

5. The display module according to claim 1, wherein the backlight module is disposed in the space.

6. The display module according to claim 1, wherein the spacer comprises a tape or a coated gel.

7. The display module according to claim 1, wherein a surface of the buffer structure faces the side frame portion of the outer frame, and the surface of the buffer structure and the side frame portion of the outer frame are separated by an empty gap.

8. The display module according to claim 1, wherein the buffer structure comprises a coated gel, the coated gel comprises an insulating material or a conductive material.

9. The display module according to claim 1, wherein the buffer structure comprises a coated gel, the coated gel has a thickness between 0.05 mm and 0.5 mm.

10. The display module according to claim 1, wherein the fixing element comprises a single-sided adhesive.

11. A manufacturing method of a display module, comprising:
    providing a display panel comprising a first substrate and a second substrate disposed oppositely, wherein the first substrate has a first side surface, the second substrate has a second side surface adjacent to the first side surface;
    disposing the display panel in an outer frame;
    disposing a buffer structure to contact the first side surface and the second side surface, wherein the buffer structure comprises a coated gel;
    disposing a backlight module, wherein the backlight module comprises an optical layer;
    disposing a spacer between the backlight module and the display panel, wherein the spacer contacts the display panel and the optical layer of the backlight module; and
    disposing a fixing element outside the outer frame and contacting the display panel, wherein a side frame portion of the outer frame is between the buffer structure and the fixing element;
    wherein the spacer and the side frame portion are completely separated by an air gap.

12. The manufacturing method of the display module according to claim 11, wherein the disposing the buffer structure to contact the first side surface and the second side surface is before the disposing the display panel in the outer frame.

13. The manufacturing method of the display module according to claim 11, wherein the disposing the buffer structure to contact the first side surface and the second side surface is after the disposing the display panel in the outer frame.

14. The manufacturing method of the display module according to claim 13, wherein the coated gel of the buffer structure is connected between the display panel and the outer frame.

15. The manufacturing method of the display module according to claim 13, wherein the coated gel of the buffer structure is separated from the outer frame by an empty gap.

16. The manufacturing method of the display module according to claim 15, wherein, a surface of the coated gel faces the side frame portion, and the surface of the coated gel and the side frame portion of the outer frame are separated by an empty gap.

17. The manufacturing method of the display module according to claim 15, wherein the outer frame has a side frame portion, a surface of the coated gel facing the side frame portion is a curved surface.

18. The manufacturing method of the display module according to claim 11, wherein the spacer comprises a tape or another coated gel.

19. The manufacturing method of the display module according to claim 11, wherein the fixing element comprises a single-sided adhesive.

20. The manufacturing method of the display module according to claim 11, wherein the coated gel comprises a conductive material.

* * * * *